(12) United States Patent
Kinomura

(10) Patent No.: US 9,744,963 B2
(45) Date of Patent: Aug. 29, 2017

(54) VEHICLE, AND CONTROL METHOD FOR VEHICLE

(75) Inventor: Shigeki Kinomura, Suntou-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/408,836

(22) PCT Filed: Aug. 31, 2012

(86) PCT No.: PCT/JP2012/072176
§ 371 (c)(1),
(2), (4) Date: Dec. 17, 2014

(87) PCT Pub. No.: WO2014/033915
PCT Pub. Date: Mar. 6, 2014

(65) Prior Publication Data
US 2015/0191164 A1 Jul. 9, 2015

(51) Int. Cl.
*B60W 10/08* (2006.01)
*B60W 20/00* (2016.01)
(Continued)

(52) U.S. Cl.
CPC .......... *B60W 20/106* (2013.01); *B60L 1/006* (2013.01); *B60L 11/123* (2013.01); *B60L 11/14* (2013.01); *B60L 11/1803* (2013.01); *B60L 11/1816* (2013.01); *B60L 11/1842* (2013.01); *B60L 11/1861* (2013.01); *B60L 15/007* (2013.01); *B60W 10/06* (2013.01); *B60W 10/08* (2013.01);
(Continued)

(58) Field of Classification Search
None
See application file for complete search history.

(56) References Cited

U.S. PATENT DOCUMENTS

| | | | |
|---|---|---|---|
| 6,672,415 B1 * | 1/2004 | Tabata | B60K 6/365 180/65.25 |
| 2007/0007056 A1 * | 1/2007 | Bowers | B60K 6/48 180/65.23 |

(Continued)

FOREIGN PATENT DOCUMENTS

| | | |
|---|---|---|
| CN | 101156295 A | 4/2008 |
| CN | 101277840 A | 10/2008 |

(Continued)

OTHER PUBLICATIONS

Partial Translation of Jan. 26, 2017 Office Action issued in Korean Application No. 2014-7036991.
(Continued)

*Primary Examiner* — Todd Melton
*Assistant Examiner* — Jason Roberson
(74) *Attorney, Agent, or Firm* — Oliff PLC

(57) ABSTRACT

A vehicle includes an engine, an electric motor, an electrical storage device and a controller. The electric motor generates electric power by using driving force of the engine. The controller controls supply of electric power, which is at least one of electric power generated by the electric motor or electric power stored in the electrical storage device, to an outside of the vehicle. The controller selects, on the basis of setting made by a user, whether to permit or prohibit generation of electric power by using the driving force of the engine.

19 Claims, 12 Drawing Sheets

(51) Int. Cl.
    *B60W 10/06*    (2006.01)
    *H02J 7/14*     (2006.01)
    *B60W 10/26*    (2006.01)
    *B60L 11/18*    (2006.01)
    *B60W 20/20*    (2016.01)
    *B60L 1/00*     (2006.01)
    *B60L 11/12*    (2006.01)
    *B60L 11/14*    (2006.01)
    *B60L 15/00*    (2006.01)
    *B60W 20/13*    (2016.01)

(52) U.S. Cl.
    CPC ............ *B60W 10/26* (2013.01); *B60W 20/13* (2016.01); *B60W 20/20* (2013.01); *H02J 7/14* (2013.01); *B60L 2210/10* (2013.01); *B60L 2210/40* (2013.01); *B60L 2240/44* (2013.01); *B60L 2250/12* (2013.01); *B60L 2260/22* (2013.01); *B60L 2260/26* (2013.01); *H02J 2007/143* (2013.01); *Y02E 60/721* (2013.01); *Y02T 10/6217* (2013.01); *Y02T 10/6286* (2013.01); *Y02T 10/645* (2013.01); *Y02T 10/7005* (2013.01); *Y02T 10/705* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y04S 10/126* (2013.01); *Y10S 903/93* (2013.01)

(56) References Cited

U.S. PATENT DOCUMENTS

| | | |
|---|---|---|
| 2008/0185197 A1 | 8/2008 | Nakamura et al. |
| 2009/0026841 A1 | 1/2009 | Nakanishi |
| 2009/0288896 A1 | 11/2009 | Ichikawa |
| 2010/0017045 A1* | 1/2010 | Nesler ................ B60L 11/1824 700/296 |
| 2013/0297129 A1 | 11/2013 | Ang et al. |

FOREIGN PATENT DOCUMENTS

| | | |
|---|---|---|
| JP | 2007-236023 A | 9/2007 |
| JP | 2008-132837 A | 6/2008 |
| JP | 2008-201262 A | 9/2008 |
| JP | 2009-278776 A | 11/2009 |
| JP | 2010-110044 A | 5/2010 |
| JP | 2011-207300 A | 10/2011 |
| KR | 2007-0066201 A | 6/2007 |
| KR | 20120071061 | 7/2012 |
| WO | 2012/101735 A1 | 8/2012 |

OTHER PUBLICATIONS

U.S. Appl. No. 15/647,515, filed Jul. 12, 2017 in the name of Kinomura.

* cited by examiner

VEHICLE, AND CONTROL METHOD FOR VEHICLE

TECHNICAL FIELD

The invention relates to a vehicle and a control method for a vehicle and, more particularly, to a vehicle and a control method for a vehicle, which are able to supply electric power generated by driving force of an engine to an outside.

BACKGROUND ART

Japanese Patent Application Publication No. 2007-236023 (Patent Document 1) describes a power supply system for a house. The power supply system supplies electrical loads in the house with electric power from a hybrid vehicle. In this power supply system, when the remaining amount of charge of a battery included in the hybrid vehicle is large, electric power stored in the battery is supplied to the house side. On the other hand, when the remaining amount of charge of the battery is small, electric power generated by the driving force of the engine is supplied to the house side (see Patent Document 1).

RELATED ART DOCUMENT

Patent Document

Patent Document 1: Japanese Patent Application Publication No. 2007-236023
Patent Document 2: Japanese Patent Application Publication No. 2009-278776

SUMMARY OF THE INVENTION

Problem to be Solved by the Invention

In the above-described power supply system, when the remaining amount of charge of the battery decreases, the engine is automatically started up, and electric power is generated. However, there is a case where start-up of the engine is undesirable even when the remaining amount of charge of the battery decreases.

For example, when the hybrid vehicle is parked in an inner garage or when electric power is supplied from the hybrid vehicle in the middle of the night, there is a case where operation of the engine is undesirable from the viewpoint of emissions, operating sound, and the like, resulting from operation of the engine. In the power supply system described in the above publication, this point is particularly not studied.

The invention is contemplated in order to solve such an inconvenience, and it is an object of the invention to, in a vehicle that is able to supply electric power generated by driving force of an engine to an outside, determine whether it is allowed to operate the engine in accordance with a usage mode of the vehicle.

Means for Solving the Problem

According to the invention, a vehicle includes an engine, an electric motor, an electrical storage device and a controller. The electric motor generates electric power by using driving force of the engine. The controller controls supply of electric power, which is at least one of electric power generated by the electric motor or electric power stored in the electrical storage device, to an outside of the vehicle. The controller selects, on the basis of setting made by a user, whether to permit or prohibit generation of electric power by using the driving force of the engine.

Preferably, the vehicle further includes an operating unit. The operating unit is operated by the user in order to select whether to permit or prohibit generation of electric power by using the driving force of the engine. The controller sets, on the basis of a state of the operating unit, whether to permit or prohibit generation of electric power by using the driving force of the engine.

Preferably, the operating unit is a switch for selecting a drive mode of the vehicle. Preferably, the vehicle is able to travel while changing a drive mode including a first drive mode and a second drive mode, the vehicle preferentially travels by using only the electric motor while stopping the engine in the first drive mode, the vehicle keeps a state quantity, indicating a state of charge of the electrical storage device, at a predetermined target by operating the engine in the second drive mode. The operating unit is a switch for selecting the first drive, mode or the second drive mode. When the second drive mode is selected in supplying electric power to an outside, the controller permits generation of electric power by using the driving force of the engine.

Preferably, when the first drive mode is selected in supplying electric power to the outside, the controller prohibits generation of electric power by using the driving force of the engine.

Preferably, the vehicle further includes a communication device configured to communicate with a communication terminal carried by the user. The communication device transmits, to the communication terminal, a signal for requesting to select whether to permit or prohibit generation of electric power by using the driving force of the engine, and receives, from the communication terminal, information about whether to permit or prohibit generation of electric power by using the driving force of the engine, determined by the user. The controller sets, on the basis of the information, whether to permit or prohibit generation of electric power by using the driving force of the engine.

Preferably, when a state of charge of the electrical storage device becomes lower than a threshold, the communication device transmits the request to the communication terminal.

Preferably, the vehicle further includes a communication device configured to communicate with a power receiving device that receives electric power from the vehicle. The communication device transmits, to the power receiving device, a signal for requesting to select whether to permit or prohibit generation of electric power by using the driving force of the engine, and receives, from the power receiving device, information about whether to permit or prohibit generation of electric power by using the driving force of the engine, determined by the user. The controller sets, on the basis of the information, whether to permit or prohibit generation of electric power by using the driving force of the engine.

Preferably, when a state of charge of the electrical storage device becomes lower than a threshold, the communication device transmits the request to the power receiving device.

Preferably, the controller controls a state of charge of the electrical storage device so that the state of charge becomes a target value of a state quantity indicating the state of charge of the electrical storage device, and is configured so that the user is allowed to preset a time period during which the target value is increased.

Preferably, the controller starts generation of electric power by using the driving force of the engine in response to the fact that a state of charge of the electrical storage device becomes lower than a predetermined value, and is configured so that the user is allowed to preset a time period during which the predetermined value is increased.

Preferably, the controller is configured so that the user is allowed to preset a time period during which generation of electric power by using the driving force of the engine is carried out irrespective of a state of charge of the electrical storage device.

Preferably, the controller is configured so that the user is allowed to preset a time period during which generation of electric power by using the driving force of the engine is prohibited.

Preferably, the controller controls a state of charge of the electrical storage device so that the state of charge becomes a target value of a state quantity indicating the state of charge of the electrical storage device, and, when the time period is set, increases the target value before beginning of the time period as compared to the target value at the time when the time period is not set.

Preferably, the controller starts generation of electric power by using the driving force of the engine in response to the fact that a state of charge of the electrical storage device becomes lower than a threshold, and increases the threshold at the time when the time period is set as compared to the threshold at the time when the time period is not set.

Preferably, when the time period is set, the controller generates electric power by using the driving force of the engine before beginning of the time period.

Preferably, the controller determines, on the basis of a preset determination condition, whether to permit or prohibit generation of electric power by using the driving force of the engine, and, when a selection made by the user differs from a result of the determination, sets whether to permit or prohibit generation of electric power by using the driving force of the engine by giving a higher priority to the result of the determination.

Preferably, the controller determines, on the basis of a preset determination condition, whether to permit or prohibit generation of electric power by using the driving force of the engine, and, when a selection made by the user differs from a result of the determination, provides the user with information for prompting confirmation of the selection made by the user.

Preferably, the determination condition includes a determination condition that is allowed to be set by the user and a determination condition that is not allowed to be set by the user.

Preferably, the determination condition that is not allowed to be set by the user includes at least one of a state of the vehicle, a region in which the vehicle travels or an environment in which the vehicle is placed.

Preferably, the controller starts generation of electric power by using the driving force of the engine in response to the fact that a state of charge of the electrical storage device becomes lower than a threshold that is set by the user.

According to the invention a control method for a vehicle is a control method for a vehicle including an engine, an electric motor that generates electric power by using driving force of the engine, and an electrical storage device. The control method includes a step of controlling supply of electric power, which is at least one of electric power generated by the electric motor or electric power stored in the electrical storage device, to an outside of the vehicle; and a step of selecting, on the basis of setting made by a user, whether to permit or prohibit generation of electric power by using the driving force of the engine.

Effect of the Invention

According to the invention, in a vehicle that is able to supply electric power generated by using driving force of an engine to an outside, a user is allowed to determine whether to operate the engine in accordance with a usage mode of the vehicle.

MODES FOR CARRYING OUT THE INVENTION

Figure 1:
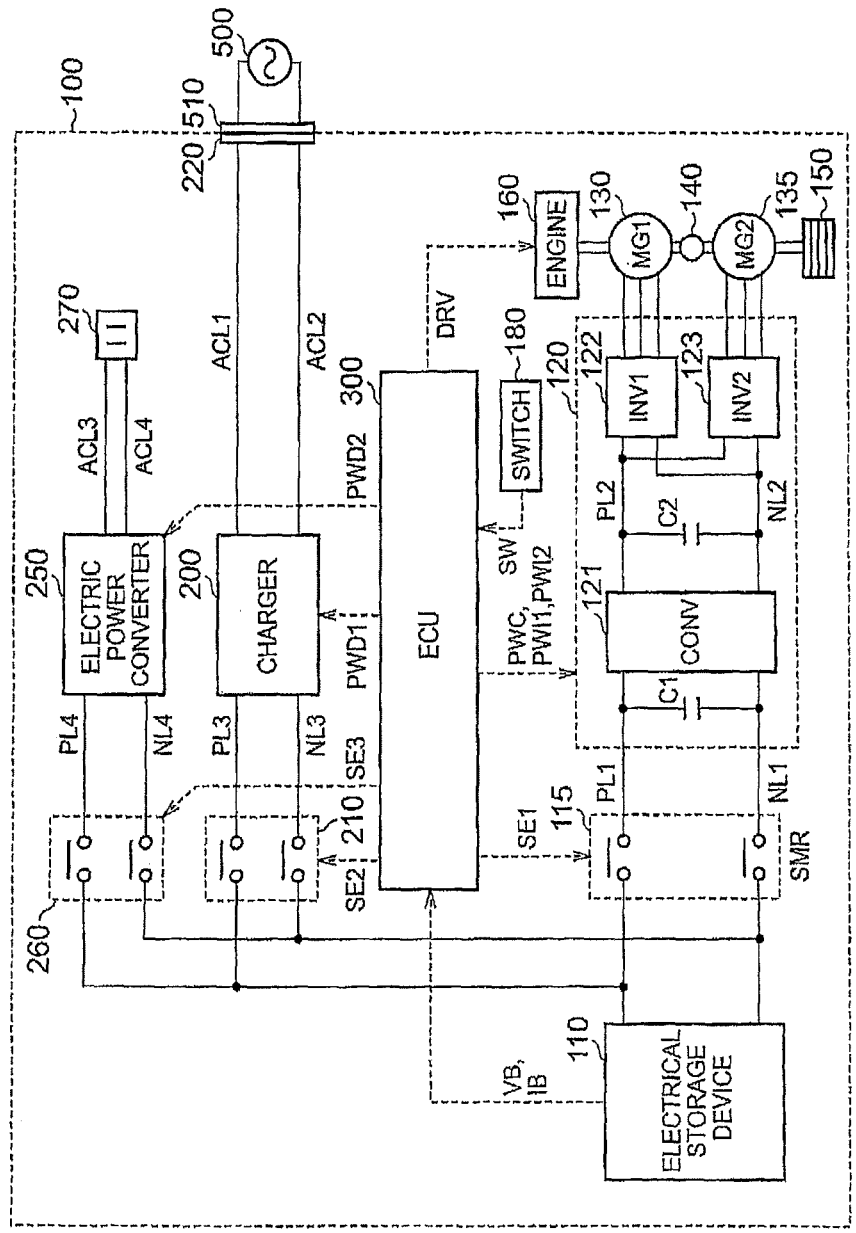
FIG. 1 is an overall block diagram of a vehicle according to a first embodiment of the invention.

Hereinafter, embodiments of the invention will be described in detail with reference to the drawings. Like reference numerals denote the same or corresponding portions in the drawings, and the description thereof will not be repeated.

First Embodiment

FIG. 1 is an overall block diagram of a vehicle according to a first embodiment of the invention. As shown in FIG. 1, the vehicle 100 includes an electrical storage device 110, a system main relay (SMR) 115, a power control unit (PCU) 120 that serves as a drive unit, motor generators 130, 135, a power transmission gear 140, a drive wheel 150, an engine 160 that serves as an internal combustion engine, and an electronic control unit (ECU) 300 that serves as a controller. The PCU 120 includes a converter 121, inverters 122, 123, and capacitors C1, C2.

The electrical storage device 110 is an electric power storage element configured to be rechargeable and dischargeable. The electrical storage device 110 is, for example, formed of a secondary battery, such as a lithium ion battery, a nickel-metal hydride battery and a lead-acid battery, or an electrical storage element, such as an electric double layer capacitor.

The electrical storage device 110 is connected to the PCU 120 via power lines PL1, NL1. The electrical storage device 110 supplies the PCU 120 with electric power for generating driving force of the vehicle 100. The electrical storage device 110 stores electric power generated by the motor generators 130, 135. The output of the electrical storage device 110 is, for example, about 200 V.

The electrical storage device 110 includes a voltage sensor and a current sensor (both are not shown). The voltage VB and current IB of the electrical storage device 110, detected by these sensors, are output to the ECU 300.

The SMR 115 includes a relay that is connected to the power line PL1 and a relay that is connected to the negative electrode terminal of the electrical storage device 110 and the power line NL1. The power line PL1 is connected to the positive electrode terminal of the electrical storage device 110 and the PCU 120. The SMR 115 switches between supply and interruption of electric power between the electrical storage device 110 and the PCU 120 on the basis of a control signal SE1 from the ECU 300.

The converter 121 converts voltage between the pair of power lines PL1, NL1 and the pair of power lines PL2, NL2 on the basis of a control signal PWC from the ECU 300.

The inverters 122, 123 are connected to the power lines PL2, NL2 in parallel with each other. Each of the inverters 122, 123 converts direct-current power from the converter 121 to alternating-current power on the basis of a corresponding one of control signals PWI1, PWI2 from the ECU 300, and drives a corresponding one of the motor generators 130, 135.

The capacitor C1 is provided between the power line PL1 and the power line NL1, and reduces fluctuations in voltage between the power line PL1 and the power line NL1. The capacitor C2 is provided between the power line PL2 and the power line NL2, and reduces fluctuations in voltage between the power line PL2 and the power line NL2.

Each of the motor generators 130, 135 is an alternating-current rotary electric machine, and is, for example, a permanent magnet synchronous motor including a rotor in which permanent magnets are embedded.

The output torque of each of the motor generators 130, 135 is transmitted to the drive wheel 150 via the power transmission gear 140, and propels the vehicle 100. The power transmission gear 140 includes a reduction gear and a power split device. Each of the motor generators 130, 135 is able to generate electric power by using the rotational force of the drive wheel 150 during regenerative braking operation of the vehicle 100. The generated electric power is converted by the PCU 120 to electric power for charging the electrical storage device 110.

The motor generators 130, 135 are also coupled to the engine 160 via the power transmission gear 140. Required vehicle driving force is generated by operating the motor generators 130, 135 and engine 160 in a coordinative manner by the ECU 300. In addition, each of the motor generators 130, 135 is able to generate electric power by using the rotation of the engine 160, and is able to charge the electrical storage device 110 with the generated electric power. In the present embodiment, the motor generator 135 is exclusively used as an electric motor for driving the drive wheel 150, and the motor generator 130 is exclusively used as a generator that is driven by the engine 160.

In FIG. 1, a configuration in which two motor generators are provided is shown as an example; however, the number of motor generators is not limited to two. The number of motor generators may be one or the number of motor generators may be more than two.

The vehicle 100 includes a charger 200, a relay 210 and an inlet 220 that serves as a connecting portion as a configuration for charging the electrical storage device 110 with electric power from an external power supply 500.

A connector 510 of the external power supply 500 is connected to the inlet 220. Electric power froze the external power supply 500 is transmitted to the vehicle 100.

The charger 200 is connected to the inlet 220 via power lines ACL1, ACL2. The charger 200 is connected to the electrical storage device 110 by power lines PL3, NL3 via the relay 210.

The charger 200 is controlled by a control signal PWD1 from the ECU 300, and converts alternating-current power, which is supplied from the inlet 220, to electric power for charging the electrical storage device 110.

The relay 210 is controlled by a control signal SE2 from the ECU 300, and switches between supply and interruption of electric power between the charger 200 and the electrical storage device 110.

The vehicle 100 includes an electric power converter 250, a relay 260 and a receptacle 270 as a configuration for converting direct-current power from the electrical storage device 110 or direct-current power generated by the motor generators 130, 135 and converted by the PCU 120 to alternating-current power, and supplying electric power to the outside of the vehicle.

The relay 260 is controlled by a control signal SE3 from the ECU 300, and switches between supply and interruption of electric power between the electric power converter 250 and the electrical storage device 110.

The electric power converter 250 is connected to the electrical storage device 110 by power lines PL4, NL4 via the relay 260. The electric power converter 250 is connected to the receptacle 270 via power lines ACL3, ACL4.

The electric power converter 250 is controlled by a control signal PWD2 from the ECU 300, and converts direct-current power, which is supplied from the electrical storage device 110 or the PCU 120, to alternating-current power.

An electrical device (not shown) outside the vehicle is connected to the receptacle 270. Electric power from the vehicle 100 is transmitted to the external electrical device.

In FIG. 1, the charger 200 and the electric power converter 250 are provided. Instead, a single electric power converter that is able to bidirectionally convert electric power may have the function of the charger 200 and the function of the electric power converter 250.

The ECU 300 includes a central processing unit (CPU), a storage device and an input/output buffer (all of which are not shown in FIG. 1). The ECU 300 inputs signals from sensors, or the like, and outputs control signals to devices. The ECU 300 controls the electrical storage device 110 and the devices of the vehicle 100. These controls are not limited to software processing but they may be processed by exclusive hardware (electronic circuit).

In FIG. 1, a single controller is provided as the ECU 300. Instead, for example, individual controllers for functions or controlled devices may be provided, like a controller for the PCU 120, a controller for the electrical storage device 110, and the like.

The ECU 300 computes a state of charge (SOC) of the electrical storage device 110 on the basis of the detected values of the voltage VB and current IB from the electrical storage device 110.

The vehicle 100 is able to travel in a drive mode, that is, a charge depleting (CD) mode or a charge sustaining (CS) mode. The CD mode is a mode in which the vehicle preferentially travels by using only the motor generator 135 while stopping the engine 160. The CS mode is a mode in which the vehicle keeps the SOC of the electrical storage device 110 at a predetermined target by operating the engine 160. The ECU 300 controls a change of the drive mode of the vehicle on the basis of the SOC.

The CS mode is a drive mode in which, where necessary, electric power is generated by the motor generator 130 by operating the engine 160 in order to keep the SOC of the electrical storage device 110 at the predetermined target. The CS mode is not limited to a mode in which the vehicle travels while constantly operating the engine 160. On the other hand, even in the CD mode, but when an accelerator pedal is depressed by a driver by a large amount, during operation of an engine-driven-type air conditioner, during engine warm-up, or the like, the operation of the engine 160 is allowed. The CD mode is a drive mode in which the vehicle is basically caused to travel by using electric power stored in the electrical storage device 110 as an energy source without keeping the SOC of the electrical storage device 110 at a predetermined target value. During the CD mode, eventually, the ratio of a discharge is relatively mostly larger than the ratio of a charge.

That is, even when the drive mode is the CD mode, but when the accelerator pedal is depressed by a large amount and large vehicle power is required, the engine 160 operates. Even when the drive mode is the CS mode, but when the SOC exceeds the target value, the engine 160 stops. Therefore, irrespective of the drive mode, traveling by using only the motor generator 135 while stopping the engine 160 is termed "EV traveling", and traveling by using both the motor generator 135 and the engine 160 by operating the engine 160 is termed "HV traveling".

The ECU 300 receives a signal SW from a switch 180 that is an operating member. The signal SW indicates the state of the switch 180. A user is allowed to select the drive mode by operating the switch 180. The ECU 300 acquires the drive mode, selected by the user, on the basis of the signal SW. The ECU 300 controls the engine 160 by the use of a control signal DRV.

In the above-described vehicle, as is found in a smart grid, or the like, the concept that a vehicle is regarded as an electric power supply source and electric power is supplied from the vehicle to a general electrical device outside the vehicle has been studied. There is also a case where a vehicle is used as a power supply when an electrical device is used in camping, outdoor work, or the like.

When electric power is supplied from a vehicle in this way, generally most of cases are on the assumption that electric power stored in an electrical storage device is supplied. When the remaining amount of charge of the electrical storage device decreases, a mode is changed so that electric power generated by the driving force of the engine 160 is supplied. However, for example, when a vehicle is parked in an inner garage or when electric power is supplied from the vehicle in the middle of the night, there is a case where operation of the engine is undesirable from the viewpoint of emissions, operating sound, and the like, resulting from operation of the engine 160.

Therefore, in the first embodiment, power supply control is executed. In the power supply control, generation of electric power by using the driving force of the engine 160 is permitted or prohibited on the basis of the drive mode selected by the user.

Figure 2:
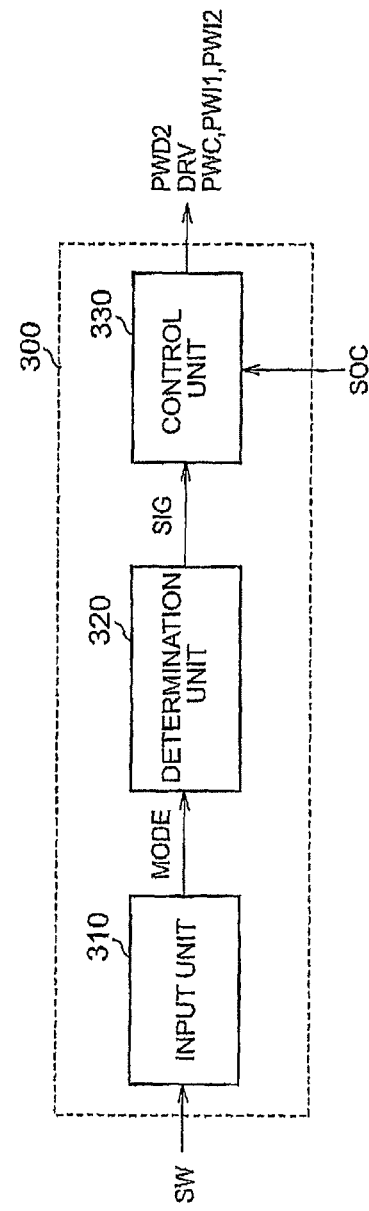
FIG. 2 is a functional block diagram related to power supply control of a controller shown in FIG. 1.

FIG. 2 is a functional block diagram related to power supply control of the ECU 300 shown in FIG. 1. As shown in FIG. 2, the ECU 300 includes an input unit 310, a determination unit 320 and a control unit 330.

The input unit 310 receives the signal SW from the switch 180. The signal SW indicates the state of the switch 180. The input unit 310 acquires the drive mode, selected by the user, on the basis of the signal SW. The input unit 310 outputs the drive mode MODE selected by the user to the determination unit 320.

The determination unit 320 determines whether to permit generation of electric power by using the driving force of the engine 160 on the basis of the drive mode MODE received from the input unit 310. Specifically, when the drive mode MODE is the CS mode, the determination unit 320 permits generation of electric power by using the driving force of the engine 160. When the drive mode MODE is the CD mode, the determination unit 320 prohibits generation of electric power by using the driving force of the engine 160. The determination unit 320 outputs a signal SIG to the control unit 330. The signal SIG indicates whether to permit generation of electric power by using the driving force of the engine 160.

The control unit 330 controls the operations of the engine 160, PCU 120 and electric power converter 250 on the basis of the signal SIG received from the determination unit 320. Specifically, when generation of electric power by using the driving force of the engine 160 is permitted, the control unit 330 starts up the engine 160 when the SOC of the electrical storage device 110 decreases. The control unit 330 controls the engine 160 and the PCU 120 so that the motor generator 130 generates electric power by using the driving force of the engine 160. The control unit 330 controls the electric power converter 250 so that generated electric power is supplied from the receptacle 270 to the external electrical device. On the other hand, when generation of electric power by using the driving force of the engine 160 is prohibited, the control unit 330 does not start up the engine 160 even when the SOC of the electrical storage device 110 decreases, and stops supplying electric power to the external electrical device.

Figure 3:
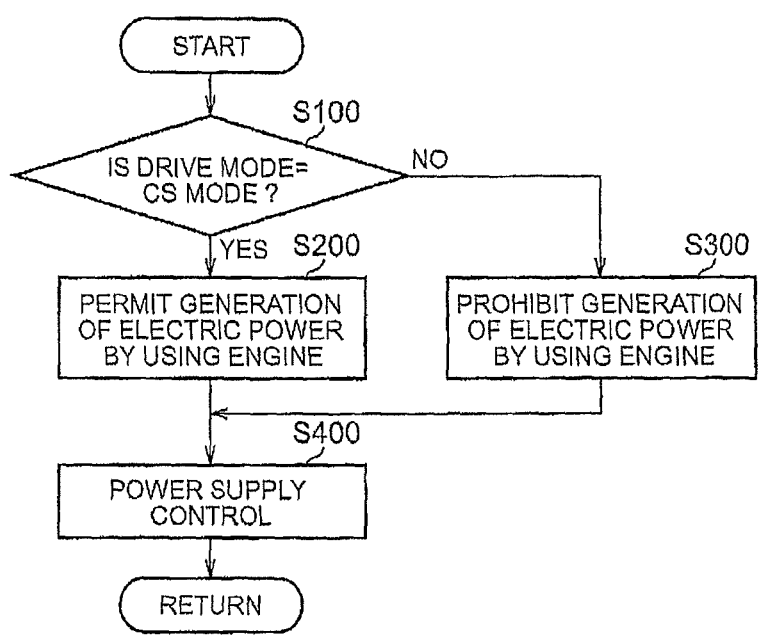
FIG. 3 is a flowchart for illustrating a process related to power supply control of the controller shown in FIG. 1.

FIG. 3 is a flowchart for illustrating a process related to power supply control of the ECU 300 shown in FIG. 1. Each of steps in flowcharts shown in FIG. 3, FIG. 6, FIG. 8 to FIG. 10, and FIG. 12 is implemented as follows. A program stored in the ECU 300 in advance is called from a main routine, and is executed at predetermined intervals or in response to fulfillment of a predetermined condition. Alternatively, part of the steps may be implemented as a process by constructing exclusive hardware (electronic circuit).

As shown in FIG. 3, the ECU 300 determiner in step (hereinafter, step is abbreviated as "S") 100 whether the drive mode selected by the user is the CS mode on the basis of the signal SW from the switch 180. When the drive mode selected by the user is the CS mode (YES in S100), the ECU 300 permits generation of electric power by using the driving force of the engine 160 (S200).

On the other hand, when the drive mode selected by the user is not the CS mode (NO in S100), the ECU 300 prohibits generation of electric power by using the driving force of the engine 160 (S300).

Subsequently, in S400, when generation of electric power by using the driving force of the engine 160 is permitted, the ECU 300 supplies electric power of the electrical storage device 110 and electric power generated by using the engine 160 to the external electrical device. On the other hand, when generation of electric power by using the driving force of the engine 160 is prohibited, the ECU 300 supplies only the electric power of the electrical storage device 110 to the external electrical device.

As described above, according to the first embodiment, the user is allowed to determine, in accordance with a usage mode of the vehicle 100, whether to operate the engine 160.

In this first embodiment, the user is allowed to select, by operating the switch 180, whether to permit or prohibit generation of electric power by using the driving force of the engine 160. Thus, the user is allowed to select whether to permit or prohibit generation of electric power by using the driving force of the engine 160 with a simple operation in accordance with a parked location, or the like, of the vehicle.

In this first embodiment, the switch for selecting the drive mode of the vehicle 100 may be utilized as a switch for selecting whether to permit or prohibit generation of electric power by using the driving force of the engine 160. Thus, it is not required to separately provide a switch for selecting whether to permit or prohibit generation of electric power by using the driving force of the engine 160, so it is possible to reduce cost.

In this first embodiment, when the CS mode is selected by the user as the drive mode, generation of electric power by using the driving force of the engine 160 is permitted. On the other hand, when the CD mode is selected by the user as the drive mode, generation of electric power by using the driving force of the engine 160 is prohibited. Thus, it is possible to set whether to permit or prohibit generation of electric power by using the driving force of the engine 160 in interlocking with the drive mode of the vehicle 100. Thus, it is possible to improve user's convenience.

Second Embodiment

In the first embodiment, the case where generation of electric power by using the driving force of the engine 160 is permitted or prohibited on the basis of the drive mode selected by the user is described.

In a second embodiment, the case where generation of electric power by using the driving force of the engine 160 is permitted or prohibited on the basis of operation of a communication terminal carried by a user will be described.

Figure 4:
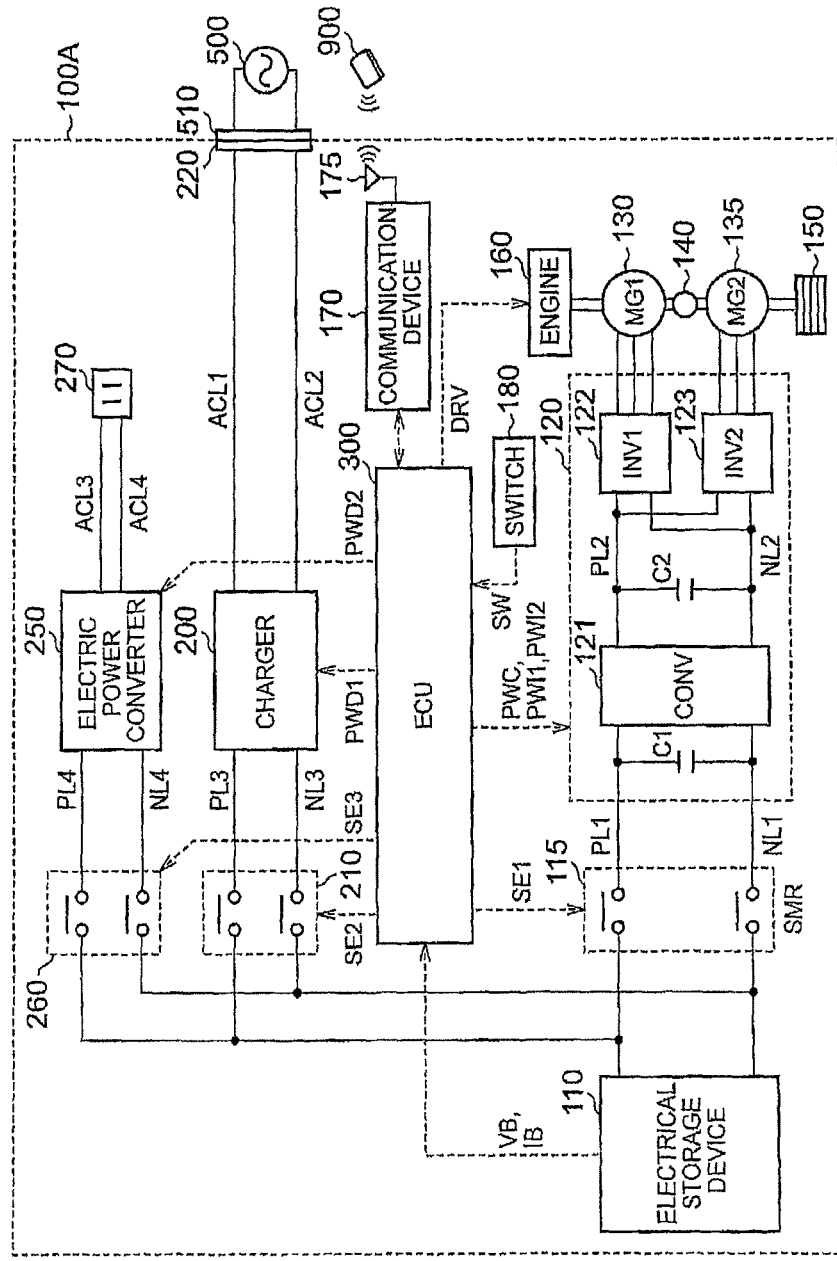
FIG. 4 is an overall block diagram of a vehicle according to a second embodiment of the invention.

FIG. 4 is an overall block diagram of a vehicle according to the second embodiment of the invention. As shown in FIG. 4, the vehicle 100A further includes a communication device 170 in addition to the Configuration of the first embodiment.

The communication device 170 is connected to the ECU 300. The communication device 170 is configured to communicate with the communication terminal 900 carried by the user. The communication device 170 wirelessly exchanges data with the communication terminal 900 via an antenna 175. The communication terminal 900 is, for example, a mobile terminal, such as a smart phone.

Figure 5:
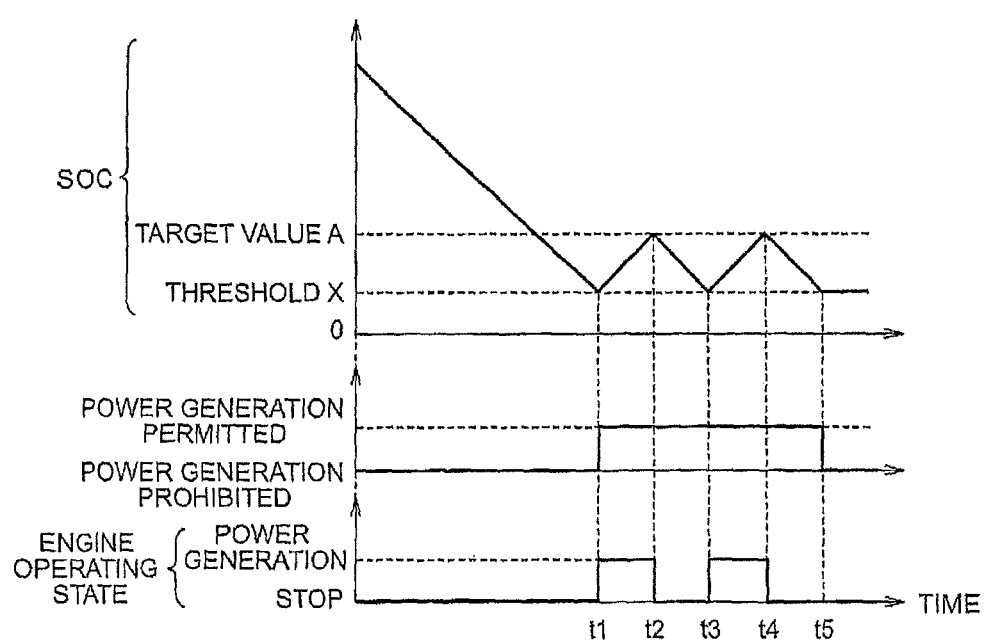
FIG. 5 is a time chart that shows an operating state of an engine to a change in an SOC of an electrical storage device shown in FIG. 4.

FIG. 5 is time chart that shows the operating state of the engine 160 to a change in the SOC of the electrical storage device 110 shown in FIG. 4.

As shown in FIG. 5, at time t1, when the SOC becomes lower than a threshold X as a result of the fact that the vehicle 100A supplies electric power to an external electrical device, the communication device 170 transmits, to the communication terminal 900, a signal for requesting to select whether to permit or prohibit generation of electric power by using the driving force of the engine 160 on the basis of a command from the ECU 300. The threshold X is, for example, a lower limit voltage value of the electrical storage device 110. The threshold X may be a value for changing between the CD mode and the CS mode. Upon reception of the request, the user determines, by operating the communication terminal 900, whether to permit or prohibit generation of electric power by using the driving force of the engine 160.

The communication device 170 receives information about whether to permit or prohibit generation of electric power by using the driving force of the engine 160, determined by the user, from the communication terminal 900, and transmits the information to the ECU 300. When the user permits generation of electric power by using the driving force of the engine 160, the ECU 300 starts generation of electric power by starting up the engine 160. On the other hand, when the user does not permit generation of electric power by using the driving force of the engine 160, the ECU 300 stops supply of electric power to the external electrical device without starting up the engine 160 when the SOC of the electrical storage device 110 reaches the lower limit.

At time t2, when the SOC exceeds a target value A as a result of generation of electric power, the ECU 300 stops the operation of the engine 160.

Figure 6:
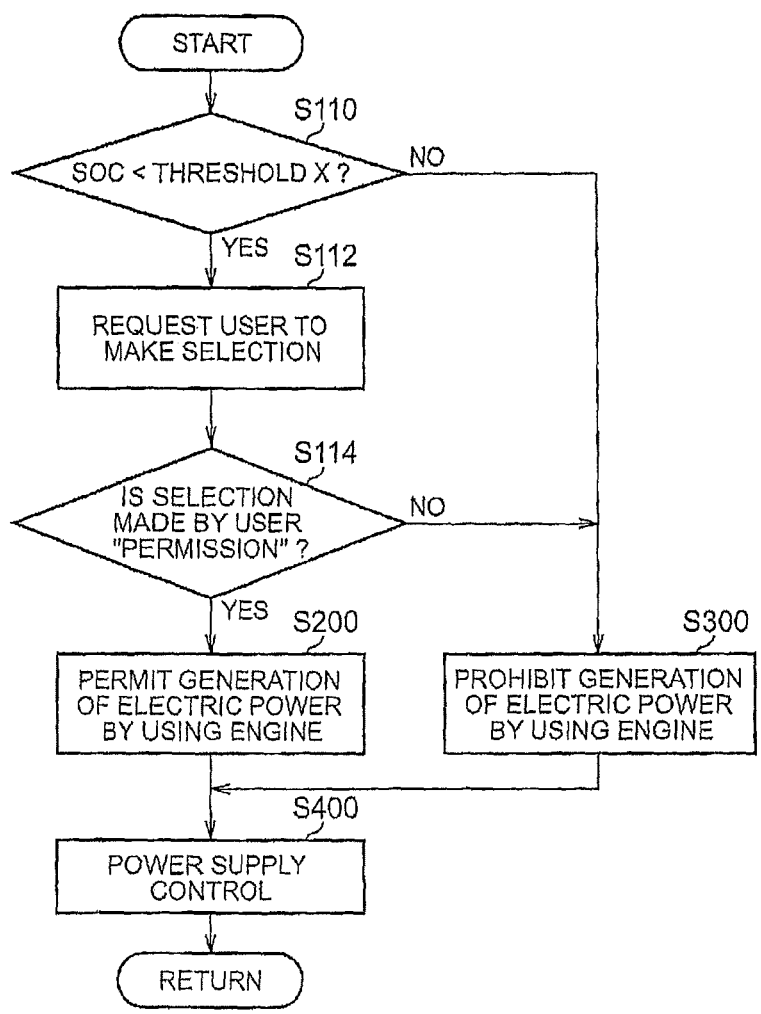
FIG. 6 is a flowchart for illustrating a process related to power supply control of a controller shown in FIG. 4.

FIG. 6 is a flowchart for illustrating a process related to power supply control of the ECU 300 shown in FIG. 4. S200 to S400 are similar to those of the first embodiment, so the description will not be repeated.

As shown in FIG. 6, in S110, the ECU 300 determines whether the SOC of the electrical storage device 110 is lower than the threshold X. When the SOC of the electrical storage device 110 is lower than the threshold X (YES in S110), the ECU 300 controls the communication device 170 so that a signal for requesting to select whether to permit or prohibit generation of electric power by using the driving force of the engine 160 is transmitted to the communication terminal 900 (S112).

Subsequently, in S114, the ECU 300 determines whether the user permits generation of electric power by using the driving force of the engine 160 on the basis of the signal received by the communication device 170. When the user permits generation of electric power by using the driving force of the engine 160 (YES in S114), the process proceeds to S200. On the other hand, when the user does not permit generation of electric power by using the driving force of the engine 160 (NO in S114), the process proceeds to S300.

When the SOC of the electrical storage device 110 is not lower than the threshold X (NO in S110), the process proceeds to S300.

As described above, in this second embodiment, generation of electric power by using the driving force of the engine 160 is permitted or prohibited on the basis of the operation of the communication terminal 900 carried by the user. Thus, the user is allowed to select operation or stop of the engine 160 even when the user is located at a place remote from the vehicle 100A.

In, this second embodiment, when the SOC becomes lower than the threshold X, the user is required to select whether to permit or prohibit generation of electric power by using the driving force of the engine 160. Thus, before the engine 160 starts up, the user is allowed to select whether to operate or stop the engine 160.

In this second embodiment, the above-described request may be provided to the user by using not the communication device 170 but a buzzer, a light, or the like, provided in the vehicle 100A. In this case, the user selects whether to operate or stop the engine by using a button, an operation screen of a navigation system, or the like, provided in the vehicle 100A.

In this second embodiment, the communication device 170 may be configured to communicate with a power receiving device that receives electric power from the vehicle 100A, instead of the communication terminal 900. In this case, the user is allowed to select, by operating the power receiving device, whether to permit or prohibit generation of electric power by using the driving force of the engine 160. The power receiving device is, for example, used to constitute a home energy management system (HEMS). Communication between the communication device 170 and the power receiving device is not limited to wireless communication, and may be wired communication.

Third Embodiment

In the second embodiment, each time there is a request from the communication device of the vehicle, it is required to operate the communication terminal carried by the user. When there is a request from the communication device, the user may not be able to operate the communication terminal soon.

In the third embodiment, a configuration that a user is allowed to set in advance a prohibition time period during which generation of electric power by using the driving force of the engine is prohibited and each user's operation is suppressed will be described.

Figure 7:
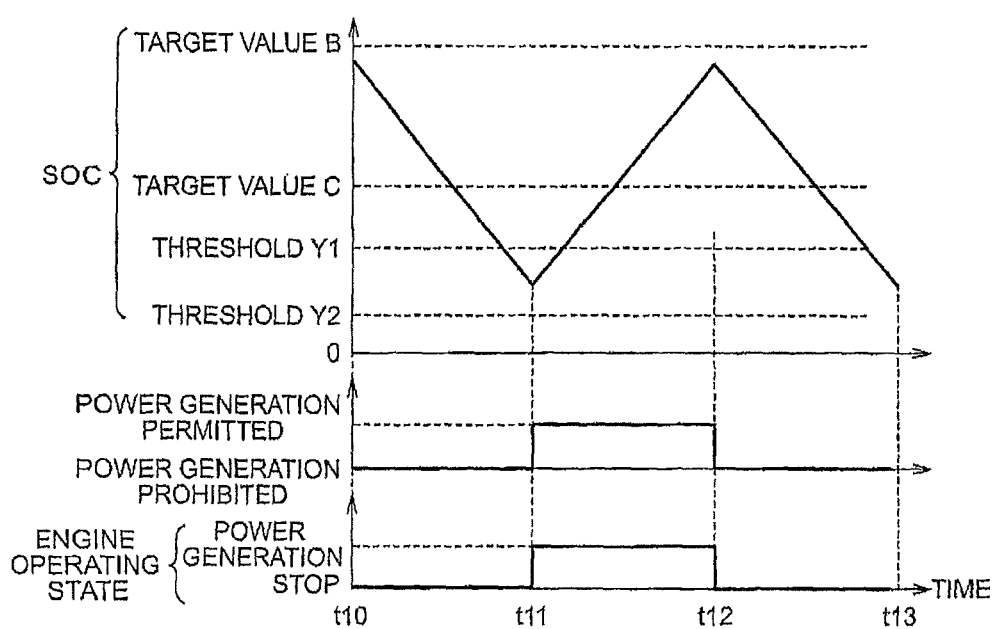
FIG. 7 is a time chart that shows an operating state of an engine to a change in an SOC of an electrical storage device according to a third embodiment of the invention.

FIG. 7 is a time chart that shows the operating state of the engine to a change in the SOC of the electrical storage device 110 according to the third embodiment of the invention.

As shown in FIG. 7, the user presets a time period between time t10 and time t11 and a time period between time t12 and time t13 as a prohibition time period in the ECU 300. The prohibition time period is set by using, for example, the communication terminal carried by the user, the operation screen of the navigation system, or the like.

At time t10, the ECU 300 starts supplying the external, electrical device with electric power from the electrical storage device 110. When the time exits from the prohibition time period at time t11, the ECU 300 starts generation of electric power by starting up the engine 160.

When the time enters the prohibition time period at time t12, the ECU 300 stops the operation of the engine 160. When a prohibition time period is set, the ECU 300 sets the target value of the SOC to a target value B. On the other hand, when no prohibition time period is set, the ECU 300 sets the target value of the SOC to a target value C. The target value B is a value higher than the target value C. In this way, by setting the target SOC such that the target SOC is high in the case where a prohibition time period is set, it is possible to ensure the amount of electric power that is dischargeable from the electrical storage device 110 in the prohibition time period.

Figure 8:
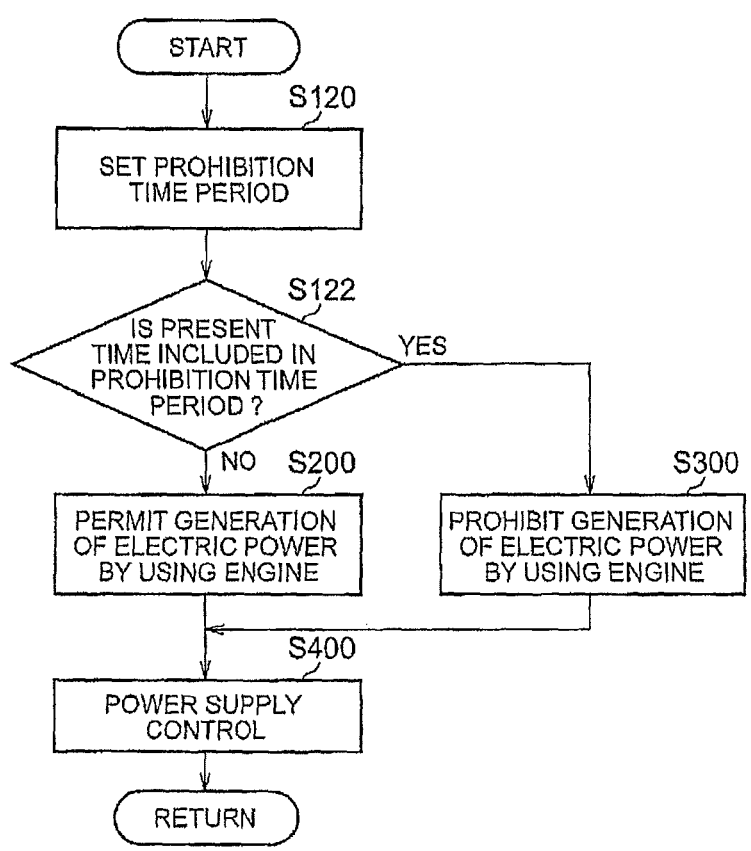
FIG. 8 is a flowchart for illustrating a process related to power supply control of a controller according to the third embodiment of the invention.

FIG. 8 is a flowchart for illustrating a process related to power supply control of the ECU 300 according to the third embodiment of the invention. S200 to S400 are similar to those of the first embodiment, so the description will not be repeated.

As shown in FIG. 8, in S120, the ECU 300 sets the prohibition time period on the basis of an input from the user.

Subsequently, in S122, the ECU 300 determines whether the present time is included in the prohibition time period. When the present time is not included in the prohibition time period (NO in S122), the process proceeds to S200. On the other hand, when the present time is included in the prohibition time period (YES in S122), the process proceeds to S300.

As described above, in this third embodiment, the user is allowed to preset the prohibition time period. Thus, it is possible to automatically change between operation and stop of the engine 160 in accordance with the prohibition time period set by the user.

In this third embodiment, the target value B in the case where the prohibition time period is set is set so as to be higher than the target value C in the case where no prohibition time period is set. Thus, it is possible to ensure the amount of electric power supplied from the electrical storage device 110 during the prohibition time period.

In this third embodiment, the following configuration may be employed. That is, generation of electric power by using the driving force of the engine 160 is started in response to the fact that the SOC of the electrical storage device 110 becomes lower than a threshold Y, and a threshold Y1 in the cage where the prohibition time period is set is configured to be higher than a threshold Y2 in the case where no prohibition time period is set. In this case as well, it is possible to ensure the amount of electric power supplied from the electrical storage device 110 during the prohibition time period.

In the third embodiment, the following alternative embodiment may be employed as a specific method of ensuring the SOC. For example, in a first alternative embodiment to the third embodiment, when the prohibition time period is set, generation of electric power by using the driving force of the engine 160 is carried out before the beginning of the prohibition time period. In this case as well, it is possible to ensure the amount of electric power supplied from the electrical storage device 110 during the prohibition time period.

In a second alternative embodiment to the third embodiment, electric power generated in the case where the prohibition time period is set is configured to be larger than electric power generated in the case where no prohibition time period is set. In this case, because the SOC quickly increases as a result of generation of electric power, even when a period that is not the prohibition time period is short, it is possible to ensure the amount of electric power supplied from the electrical storage device 110 during the prohibition time period.

In a third alternative embodiment to the third embodiment, instead of the prohibition time period, a time period during which the target value of the SOC of the electrical storage device 110 is increased is allowed to be preset by the user. In this case, the user is allowed to keep the SOC through generation of electric power by using the driving force of the engine 160 during a time period during which the operation of the engine 160 is permitted.

In a fourth alternative embodiment to the third embodiment, generation of electric power by using the driving force of the engine 160 may be started hi response to the fact that the SOC of the electrical storage device 110 become lower than a predetermined value and, instead of the prohibition time period, a time period during which the predetermined value is increased may be preset by the user. In this case as well, the user is allowed to keep the SOC through generation of electric power by using the driving force of the engine 160 during a time period during which the operation of the engine 160 is permitted.

In a fifth alternative embodiment to the third embodiment, instead of the prohibition time period, a time period during which generation of electric power by using the driving force of the engine 160 is carried out irrespective of the SOC of the electrical storage device 110 may be preset by the user. In this case as well, the user is allowed to keep the SOC through generation of electric power by using the driving force of the engine 160 during a time period during which the operation of the engine 160 is permitted.

Fourth Embodiment

In a fourth embodiment, a configuration that whether to permit or prohibit generation of electric power by using the driving force of the engine is set on the basis of a selection made by the user and a result of determination as to a preset determination condition will be described.

Figure 9:
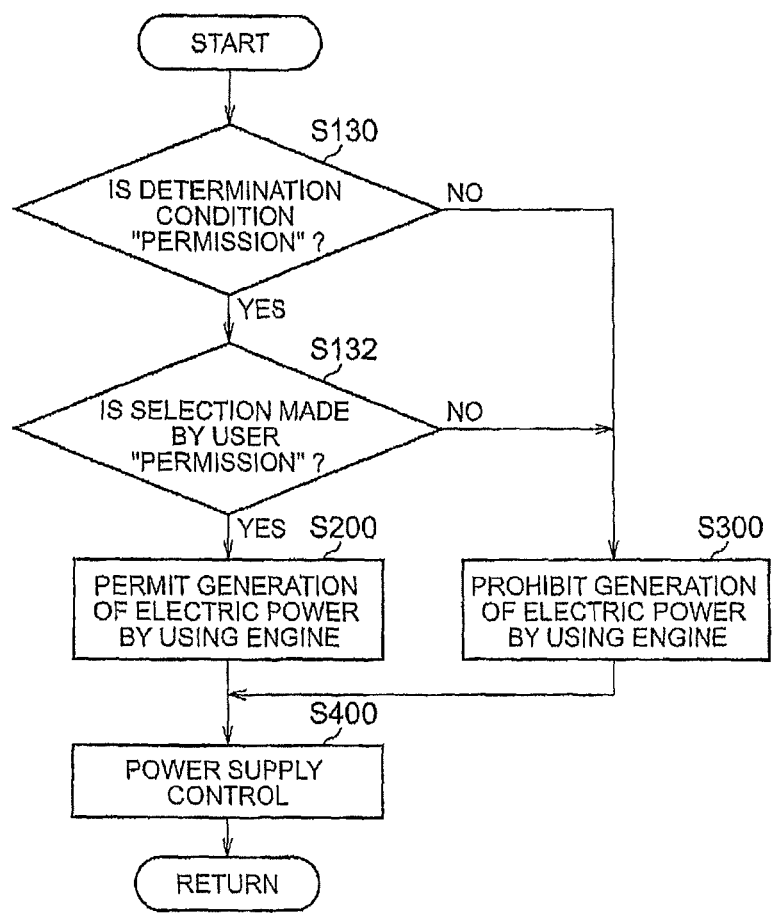
FIG. 9 is a flowchart for illustrating a process related to power supply control of a controller according to a fourth embodiment of the invention.

FIG. 9 is a flowchart for illustrating a process related to power supply control of the ECU 300 according to the fourth embodiment of the invention. S200 to S400 are similar to those of the first embodiment, so the description will not be repeated.

As shown in FIG. 9, in S130, the ECU 300 determines whether to permit generation of electric power by using the engine on the basis of the preset determination condition. The preset determination condition is a determination condition based on information detected by the vehicle, and includes a determination condition that is allowed to be set by the user and a determination condition that is not allowed to be set by the user. The determination condition that is allowed to be set by the user is, for example, a determination condition based on information about electricity charge. The determination condition that is not allowed to be set by the user includes at least one of the state of the vehicle, a region in which the vehicle travels or an environment in which the vehicle is placed. The state of the vehicle is, for example, a situation that an engine coolant temperature exceeds an upper limit value. The region in which the vehicle travels, for example, indicates that the position of the vehicle obtained from navigation information of the GPS, or the like, falls within a predetermined range. The environment in which the vehicle is placed is, for example, a situation that the vehicle is located in an indoor garage and there is no exhaust as evaluation equipment, a situation that there is a combustible material around the vehicle, or the like.

When generation of electric power by using the engine is permitted (YES in S130), the process proceeds to S132. On the other hand, when generation of electric power by using the engine is not permitted (NO in S130), the process proceeds to S300.

In S132, the ECU 300 determines whether the selection made by the user permits generation of electric power by using the engine. The user makes a selection by using, for example, the switch 180 or the communication terminal 900. When the selection made by the user permits generation of electric power by using the engine (YES in S132), the process proceeds to S200. On the other hand, when the selection made by the user does not permits generation of electric power by using the engine (NO in S132), the process proceeds to S300.

As described above, in this fourth embodiment, when the selection made by the user differs from the result of determination as to the preset determination condition, the ECU 300 sets whether to permit or prohibit generation of electric power by using the driving force of the engine by giving a higher priority to the result of determination. Thus, even when the user has made an erroneous operation, it is possible to ensure safety.

Alternative Embodiment

In an alternative embodiment to the fourth embodiment, as well as the fourth embodiment, whether to permit or prohibit generation of electric power by using the driving force of the engine is set on the basis of the selection made by the user and the result of determination as to the preset determination condition. In addition, in the alternative embodiment to the fourth embodiment, when the selection made by the user differs from the result of determination as to the preset determination condition, information for prompting confirmation of the selection made by the user is provided to the user.

Figure 10:
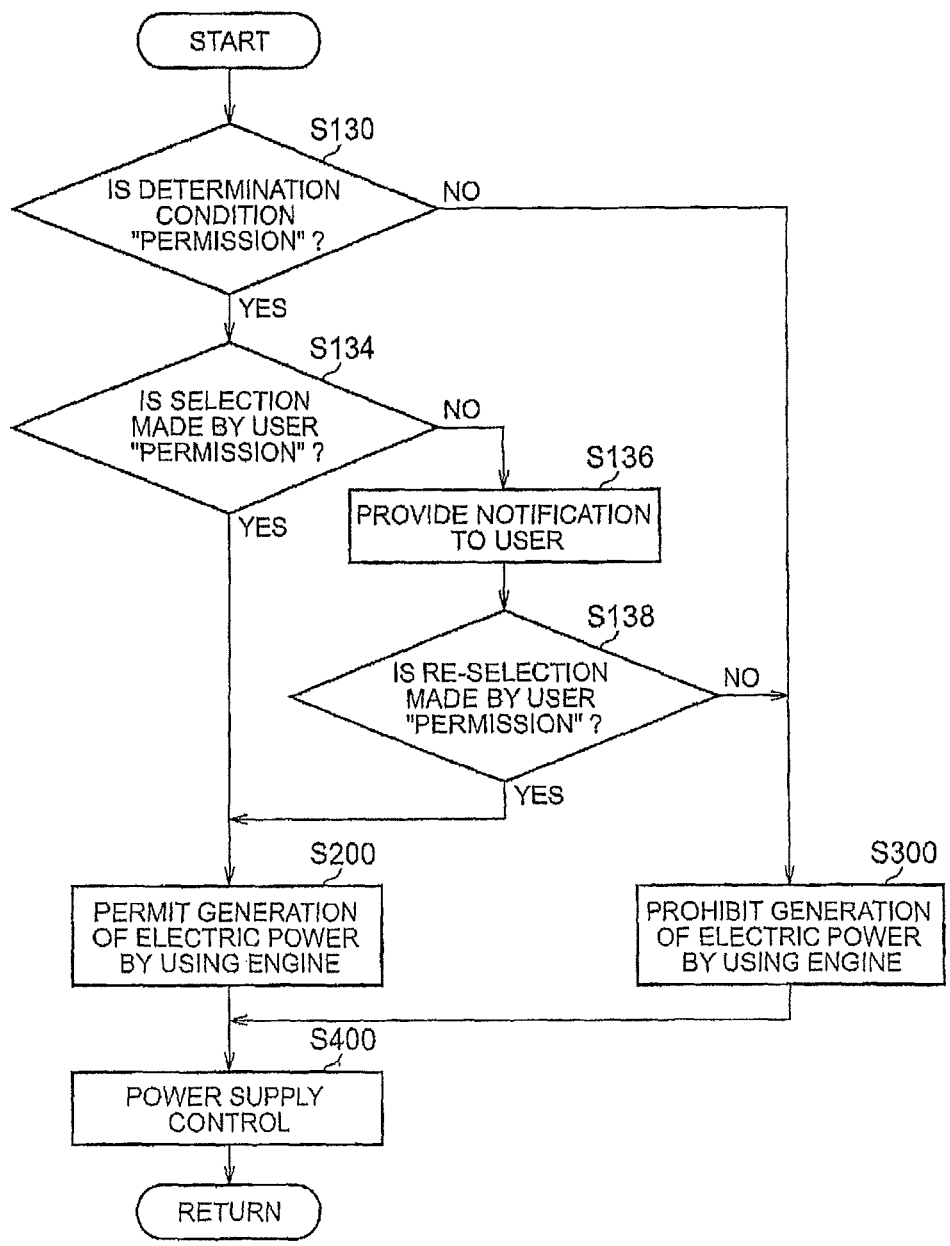
FIG. 10 is a flowchart for illustrating a process related to power supply control of a controller according to an alternative embodiment to the fourth embodiment of the invention.

FIG. 10 is a flowchart for illustrating a process related to power supply control of the ECU 300 according to the alternative embodiment to the fourth embodiment of the invention. S130, and S200 to S400 are similar to those of the fourth embodiment, so the description will not be repeated.

As shown in FIG. 10, in S134, the ECU 300 determines whether the selection made by the user permits generation of electric power by using the engine. The user makes the selection by using, for example, the switch 180 or the communication terminal 900. When the selection made by the user permits generation of electric power by using the engine (YES in S134), the process proceeds to S200. On the other hand, when the selection made by the user does not permits generation of electric power by using the engine (NO in S134), the process proceeds to S136.

In S136, the ECU 300 provides the user with notification that the selection made by the user differs from the result of determination as to the preset determination condition.

Subsequently, when the ECU 300 receives a re-selection made by the user in S138, the ECU 300 determines whether the re-selection made by the user permits generation of electric power by using the engine. When the re-selection made by the user permits generation of electric power by using the engine (YES in S138), the process proceeds to S200. On the other hand, when the re-selection made by the user does not permit generation of electric power by using the engine (NO in S138), the process proceeds to S300.

As described above, in this alternative embodiment to the fourth embodiment, when the selection made by the user differs from the result of determination as to the preset determination condition, the ECU 300 provides the user with information for prompting confirmation of the selection made by the user. Thus, as in the case of the fourth embodiment, even when the user has made an erroneous operation, it is possible to ensure safety.

Fifth Embodiment

In a fifth embodiment, a configuration that the user is allowed to set the SOC at which start-up of the engine begins will be described.

Figure 11:
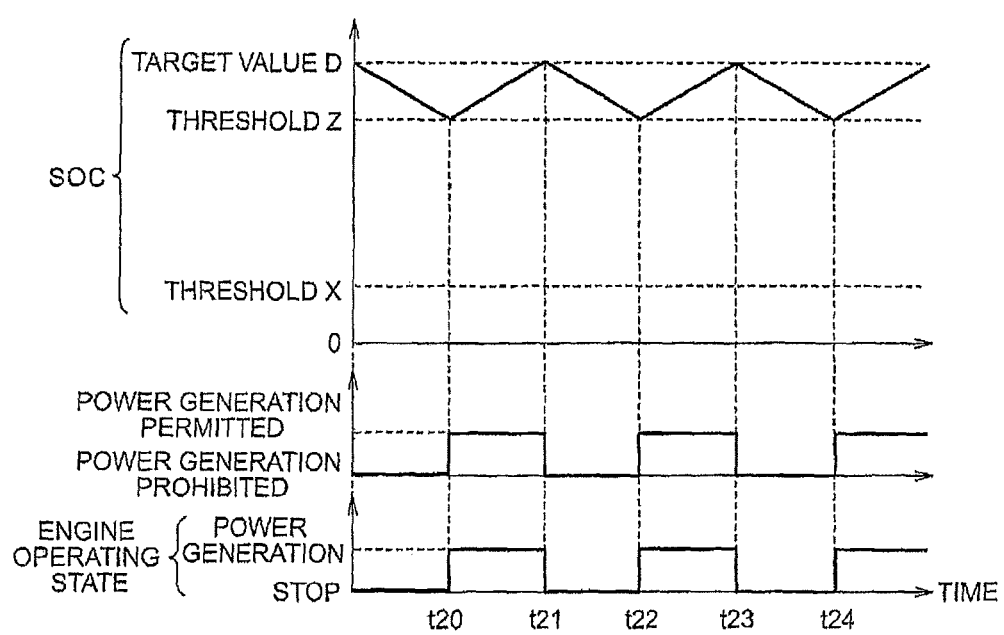
FIG. 11 is a time chart that shows an operating state of an engine to a change in an SOC of an electrical storage device according to a fifth embodiment of the invention.

FIG. 11 is a time chart that shows the operating state of the engine to a change in the SOC of the electrical storage device 110 according to the fifth embodiment of the invention.

As shown in FIG. 11, the user presets a threshold Z in the ECU 300. The threshold Z is used to start generation of electric power by using the driving force of the engine 160.

The threshold Z is set by using, for example, the communication terminal carried by the user, the operation screen of the navigation system, or the like. When the SOC becomes lower than the threshold Z as a result of supply of electric power from the vehicle 100 to the external electrical device at time t20, the ECU 300 starts generating electric power by starting up the engine 160.

When the SOC exceeds a target value D as a result of generation of electric power at time t21, the ECU 300 stops the operation of the engine 160.

Figure 12:
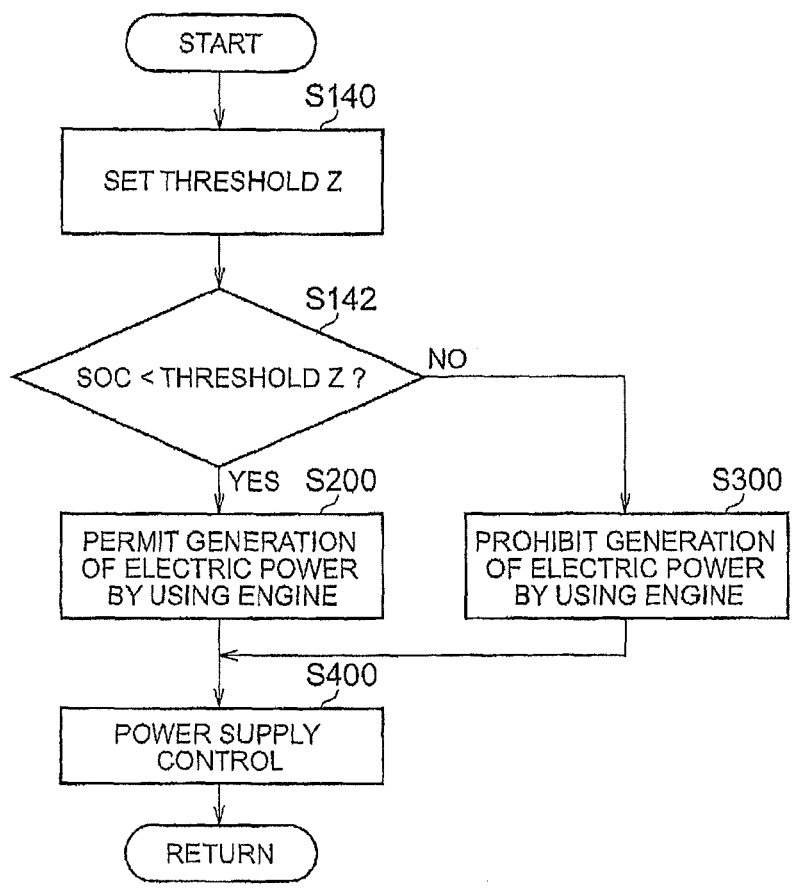
FIG. 12 is a flowchart for illustrating a process related to power supply control of a controller according to the fifth embodiment of the invention.

FIG. 12 is a flowchart for illustrating a process related to power supply control of the ECU 300 according to the fifth embodiment of the invention. S200 to S400 are similar to those of the first embodiment, so the description will not be repeated.

As shown in FIG. 12, in S140, the ECU 300 sets the threshold Z on the basis of an input from the user.

Subsequently, in S142, the ECU 300 determines whether the SOC is lower than the threshold Z. When the SOC is lower than the threshold Z (YES in S142), the process proceeds to S200. On the other hand, when the SOC is not lower than the threshold Z (NO in S142), the process proceeds to S300.

As described above, in this fifth embodiment, the user is allowed to set the SOC at which start-up of the engine begins. Thus, by increasing the SOC at which start-up of the engine begins, it is possible to keep the SOC high in the case where electric power is supplied to the external electrical device. Thus, even after supply of electric power to the external electrical device is completed, it is possible to ensure the amount of electric power for carrying out EV traveling.

In the above description, the motor generators 130, 135 each correspond to one embodiment of an "electric motor" according to the invention, and the switch 180 corresponds to one embodiment of an "operating unit" according to the invention. The CD mode corresponds to one embodiment of a "first drive mode" according to the invention. The CS mode corresponds to one embodiment of a "second drive mode" according to the invention.

The embodiments described above are illustrative and not restrictive in all respects. The scope of the invention is defined by the appended claims rather than the above description. The scope of the invention is intended to encompass all modifications within the scope of the appended claims and equivalents thereof.

DESCRIPTION OF REFERENCE NUMERALS 100, 100A vehicle, 110 electrical storage device, 120 PCU, 121 converter, 122, 123 inverter, 130, 135 motor generator, 140 power transmission gear, 150 drive wheel, 160 engine, 170 communication device, 175 antenna, 180 switch, 200 charger, 210, 260 relay, 220 inlet, 250 electric power converter, 270 receptacle, 500 external power supply, 510 connector, 900 communication terminal

The invention claimed is:

1. A vehicle comprising:
an engine;
an electric motor configured to generate electric power by using driving force of the engine;
a battery configured to store the electric power generated by the electric motor;
a controller configured to
control supply of electric power, which is at least one of first electric power or second electric power, to an electrical load located outside the vehicle, the first electric power being electric power generated by the electric motor, the second electric power being electric power stored in the battery, and
select, based on a setting made by a user, whether to supply electric power to the electrical load located outside the vehicle in either a first supply mode or in a second supply mode, (i) in the first supply mode generation of electric power by using the driving force of the engine is permitted while electric power is being supplied to the electrical load located outside the vehicle so that the first electric power and the second electric power are supplied in the first supply mode, (ii) in the second supply mode generation of electric power by using the driving force of the engine is prohibited while electric power is being supplied to the electrical load located outside the vehicle so that the second electric power but not the first electric power is supplied in the second supply mode; and
a communication device configured to (a) transmit a signal to a communication terminal carried by the user, the signal requesting the user to select whether to permit or prohibit the generation of electric power by using the driving force of the engine, and (b) receive from the communication terminal carried by the user first information about whether to permit or prohibit the generation of electric power by using the driving force of the engine, which is determined by the user, wherein
the controller is configured to set, based on the first information, whether to supply the electric power to the electrical load located outside the vehicle in the first supply mode or in the second supply mode.

2. The vehicle according to claim 1, further comprising:
an operating unit configured to be operated by the user in order to select whether to permit or prohibit the generation of electric power by using the driving force of the engine, wherein
the controller is configured to set, based on a state of the operating unit, whether to supply the electric power to the electrical load located outside the vehicle in the first supply mode or in the second supply mode.

3. The vehicle according to claim 2, wherein
the operating unit is a switch by which a drive mode of the vehicle is selected through operation of the user.

4. The vehicle according to claim 2, wherein
the vehicle is configured to travel while changing between a first drive mode and a second drive mode, the first drive mode is a drive mode in which the vehicle preferentially travels by using only the electric motor while stopping the engine, the second drive mode is a drive mode in which the vehicle keeps a state quantity of the battery at a predetermined target by operating the engine, the state quantity is an amount that indicates a state of charge of the battery,
the operating unit is a switch that is operated by the user in order to select the first drive mode or the second drive mode, and
the controller is configured to, when the second drive mode is selected in supplying electric power to the outside of the vehicle, supply the electric power to the electrical load located outside the vehicle in the first supply mode.

5. The vehicle according to claim 4, wherein, the controller is configured to, when the first drive mode is selected in supplying electric power to the outside of the vehicle, supply the electric power to the electrical load located outside the vehicle in the second supply mode.

6. The vehicle according to claim 1, wherein
the communication device is configured to, when a state of charge of the battery becomes lower than a threshold, transmit the signal to the communication terminal.

7. The vehicle according to claim 1, wherein
the controller is configured to control a state of charge of the battery such that a state quantity of the battery becomes a target value, the state quantity is an amount indicating the state of charge of the battery, and a time period during which the target value is increased is preset by the user.

8. The vehicle according to claim 1, wherein
the controller is configured to start the generation of electric power by using the driving force of the engine in response to a state of charge of the battery becoming lower than a predetermined value, and a time period during which the predetermined value is increased is preset by the user.

9. The vehicle according to claim 1, wherein
the controller is configured to allow the user to preset a time period during which the generation of electric power by using the driving force of the engine is carried out irrespective of a state of charge of the battery.

10. The vehicle according to claim 1, wherein
the controller is configured to allow the user to preset a time period during which the generation of electric power by using the driving force of the engine is prohibited.

11. The vehicle according to claim 10, wherein
the controller is configured to control a state of charge of the battery such that a state quantity of the battery becomes a target value,
when the time period is set, the target value is set before beginning of the time period, and
the target value at the time when the time period is set is higher than the target value at the time when the time period is not set.

12. The vehicle according to claim 10, wherein
the controller is configured to start the generation of electric power by using the driving force of the engine in response to a state of charge of the battery becoming lower than a threshold, and
the threshold at the time when the time period is set is higher than the threshold at the time when the time period is not set.

13. The vehicle according to claim 10, wherein
the controller is configured to, when the time period is set, generate electric power by using the driving force of the engine before beginning of the time period.

14. The vehicle according to claim 1, wherein
the controller is configured to
determine, based on at least one of preset determination conditions, whether to permit or prohibit the generation of electric power by using the driving force of the engine, and
when a selection made by the user differs from a result of the determination, set whether to permit or prohibit the generation of electric power by using the driving force of the engine by giving a higher priority to the result of the determination, the selection is a selection by the user of whether to permit or prohibit the generation of electric power by using the driving force of the engine.

15. The vehicle according to claim 14, wherein
the determination conditions include a determination condition that is set by the user and a determination condition that is set not by the user.

16. The vehicle according to claim 15, wherein
the determination condition that is set not by the user includes at least one of a state of the vehicle, a region in which the vehicle travels or an environment in which the vehicle is placed.

17. The vehicle according to claim 1, wherein
the controller is configured to
determine, based on a preset determination condition, whether to permit or prohibit the generation of electric power by using the driving force of the engine, and
when a selection made by the user differs from a result of the determination, provide the user with second information, the second information is information prompting confirmation of the selection made by the user, the selection is a selection by the user of whether to permit or prohibit the generation of electric power by using the driving force of the engine.

18. The vehicle according to claim 1, wherein
the controller is configured to start the generation of electric power by using the driving force of the engine in response to a state of charge of the electric storage device becoming lower than a threshold that is set by the user.

19. A control method for a vehicle, the vehicle including an engine, an electric motor, a battery, a communication device, and a controller, the electric motor being configured to generate electric power by using driving force of the engine, the battery being configured to store the electric power generated by the electric motor, the control method comprising:
controlling, by the controller, supply of electric power, which is at least one of first electric power or second electric, to an electrical load located outside the vehicle, the first electric power being electric power generated by the electric motor, the second electric power being electric power stored in the battery; and
selecting, by the controller, based on a setting made by a user, whether to supply electric power to the electrical load located outside the vehicle in either a first supply mode or in a second supply mode, (i) in the first supply mode generation of electric power using the driving force of the engine is permitted while supplying electric power to the electrical load located outside the vehicle so that the first electric power and the second electric power are supplied in the first supply mode, (ii) in the second supply mode generation of electric power by using the driving force of the engine is prohibited while electric power is being supplied to the electrical load located outside the vehicle so that the second electric power but not the first electric power is supplied in the second supply mode, wherein
the communication device (a) transmits a signal to a communication terminal carried by the user, the signal requesting the user to select whether to permit or prohibit the generation of electric power by using the driving force of the engine, and (b) receives from the communication terminal carried by the user first information about whether to permit or prohibit the generation of electric power by using the driving force of the engine, which is determined by the user, and
the controller sets, based on the first information, whether to supply the electric power to the electrical load located outside the vehicle in the first supply mode or in the second supply mode.

* * * * *